(12) United States Patent
Knight et al.

(10) Patent No.: US 8,832,024 B2
(45) Date of Patent: Sep. 9, 2014

(54) SIMPLIFIED COPY OFFLOAD

(71) Applicant: NetApp, Inc., Sunnyvale, CA (US)

(72) Inventors: Frederick E. Knight, Cary, NC (US); John Meneghini, Waltham, MA (US); Arun Kumar Rajendran, Bangalore (IN); Santosh A. Rao, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/661,372

(22) Filed: Oct. 26, 2012

(65) Prior Publication Data

US 2014/0122434 A1    May 1, 2014

(51) Int. Cl.
*G06F 17/00* (2006.01)

(52) U.S. Cl.
USPC ............ 707/633; 707/610; 707/640; 709/248

(58) Field of Classification Search
None
See application file for complete search history.

(56) References Cited

U.S. PATENT DOCUMENTS

| | | | |
|---|---|---|---|
| 5,819,292 A | 10/1998 | Hitz et al. | |
| 7,313,720 B1 * | 12/2007 | Eng et al. | 714/6.12 |
| 7,454,445 B2 | 11/2008 | Lewis et al. | |
| 7,899,913 B2 * | 3/2011 | Minami et al. | 709/227 |
| 8,065,431 B2 * | 11/2011 | Taylor et al. | 709/236 |
| 8,126,935 B2 * | 2/2012 | Hitz et al. | 707/803 |
| 8,549,170 B2 * | 10/2013 | Minami et al. | 709/237 |
| 2005/0149632 A1 * | 7/2005 | Minami et al. | 709/237 |
| 2005/0246401 A1 * | 11/2005 | Edwards et al. | 707/205 |
| 2006/0184821 A1 * | 8/2006 | Hitz et al. | 714/6 |
| 2008/0189343 A1 * | 8/2008 | Hyer et al. | 707/205 |
| 2009/0292748 A1 * | 11/2009 | Hitz et al. | 707/205 |
| 2012/0079583 A1 * | 3/2012 | Christiansen et al. | 726/9 |
| 2012/0110281 A1 * | 5/2012 | Green et al. | 711/154 |
| 2012/0150807 A1 * | 6/2012 | Eng et al. | 707/649 |

OTHER PUBLICATIONS

Frederick Knight, "Storage Data Movement Offload", NetApp, Sep. 2011.*
James Lentini, "NFS Server-side Copy Design and Standardization", Advanced Technology Group, NetApp, 2010.*

* cited by examiner

*Primary Examiner* — Hung Le
(74) *Attorney, Agent, or Firm* — Perkins Coie LLP

(57) ABSTRACT

Methods and apparatuses for performing simplified copy offload operations are provided. In one exemplary embodiment, a method includes creating a persistent point-in-time image of a data set of a source storage device in response to receiving a token request for a copy offload operation from a host. Creating the persistent point-in-time image includes generating pointers to data blocks of the data set, but does not include duplicating the data blocks. The method also includes transmitting a token that is a representation of the persistent point-in-time image to the host in response to the request.

27 Claims, 10 Drawing Sheets

SIMPLIFIED COPY OFFLOAD

TECHNICAL FIELD

Various embodiments of the present application generally relate to the field of managing data on data storage devices. More specifically, various embodiments of the present application relate to methods and systems for performing copy offload operations.

BACKGROUND

The proliferation of computers and computing systems has resulted in a continually growing need for efficient and reliable storage of data. Host computing devices make use of data storage devices of many types and complexities to satisfy the growing data storage needs. The types of data storage devices commonly used range from individual flash memory devices and hard drives to storage servers and clusters of storage servers. A storage server is a specialized computer that provides storage services related to the organization and storage of data, to one or more clients. The data is typically stored on writable persistent storage media, such as non-volatile memories and disks. A storage server is configured to operate according to a client/server model of information delivery and may enable many clients or applications to access the data served by the system. A storage server can employ a storage architecture that serves the data with both random and streaming access patterns at either a file level, as in network attached storage (NAS) environments, or at the block level, as in a storage area network (SAN).

The management of data on data storage devices often includes copying data from one storage location to another. In addition, data is sometimes copied from one location in a storage device or system to another location within that same storage device or system. A traditional method for a host to perform this type of copy operations is for the host to read the data from the source storage device into the memory of the host and then transfer the data to the destination storage location, under the control of the host. This may be accomplished by the host performing a series of buffered read/write processes on smaller chunks of the data that is being copied.

While the host-centered copy process described above may work well if the host has available bandwidth and/or the quantity of data is relatively small, the burdens associated with copying data in this manner can become significant in some cases. In addition to consuming central processing unit (CPU) resources of the host, if the data is transferred over a network, network bandwidth is unnecessarily consumed because the data is first transmitted to the host and then from the host to the destination. Copy offload processes allow these types of data transfers to occur in a more efficient manner by transferring data directly between storage devices, for example one disk drive to another. In some cases, these types of copy offload processes are referred to as offloaded data transfer (ODX).

An ODX process is defined for Microsoft Windows. In the Windows ODX operation, a host transmits a request to a source storage device or system identifying data to be copied. The host receives a token representing the data of interest from the storage device. The token does not contain the data but acts as a unique identifier and/or locator for the data. The host then uses an offload write command, including the token, to request data movement from the source to a destination storage location. Windows ODX is designed to work with storage devices which implement the Small Computer System Interface (SCSI) standard. Specifically, Windows ODX features are supported in device which implement SCSI Primary Commands—4 (SPC-4) and SCSI Block Commands—3 (SBC-3). These commands are defined by the T10 committee. T10 is a technical committee of the International Committee on Information Technology Standards (INCITS) and is responsible for SCSI architectural standards and storage interfaces. Copy offload processes may also be used in other operating environments and in conjunction with other operating protocols such as Common Internet File System (CIFS).

In the processes described above, the token is used to initiate the copying of the data from one location to another. The token may also be transferred or exchanged among various hosts. When the token is provided to the destination storage device, a copy of the associated data is transferred directly to the destination device. The transfer process occurs through communication between the source and the destination devices without the data having to flow through the host and without the host managing the data transfer process.

In addition to reducing the use of host computing resources, and potentially network bandwidth, the use of a token allows the copy or data transfer process to be separated from other operations of the host. Once the host interacts with the source storage device to create the token, the actual copying or transfer of the data can occur at a later point in time. While this is beneficial in some respects, it presents additional challenges for the storage device or system. In many cases, the data associated with the token may be subject to change at any time. If the data changes in the interim, the token may no longer be valid because it no longer represents the data that existed at the time the token was created. There are several possible solutions to this problem.

One possible solution is to make a copy of the associated data in the source storage device when the token is created. If the original data changes in the interim, the copy can remain unchanged. This approach has the drawback of requiring additional storage space and resources to create and maintain a complete copy of the data associated with every token that is created.

Another possible solution is to invalidate a token whenever the associated data changes. This approach is sometimes called write tracking and requires continuous monitoring of the data for any potential write activities. Although this approach introduces only a moderate amount of additional computational overhead, it eliminates some of the usefulness of the token approach because the lifetime of a token is unknown and the token may be invalidated before it is used.

Another possible solution to the problem is to continually monitor the data associated with a token. In some cases, this approach is referred to as copy-on-write. A copy of the data is not created at the time the token is created, but all writes to the device or system are monitored to determine if a write will affect or change any data for which a token has been created. If such a change is detected, a copy of the data is then made, before the writing, such that a copy is maintained that is representative of the state of the data at the time the token was created. This approach has the drawback of requiring the additional overhead of monitoring all writes to the device or system during the life of the token(s) and may also require the use of additional storage space to make copies of the data if changes are detected.

SUMMARY

Methods and apparatuses for supporting copy offloads in data storage devices and systems are introduced here. These methods and apparatuses resolve the problems described above by providing support for token-based copy offload processes that does not require write tracking or the making of additional copies of data when tokens are created. The techniques described here accomplish this by using persistent point-in-time images of data sets that are created using data pointers.

In one embodiment, a method includes receiving a token request for a copy offload operation from a host. In response to receiving the request, a persistent point-in-time image of a data set of a source storage device is created. Creating the point-in-time image includes generating pointers to data blocks of the data set and does not include duplicating the data blocks. The method further includes transmitting a token that is a representation of the persistent point-in-time image to the host in response to the request. In some cases, the method also includes subsequently writing or making changes to the data set without affecting the persistent point-in-time image or the token.

In another embodiment, a non-transitory machine-readable medium comprising instructions is provided. The instructions direct a processor to perform a copy offload operation that includes generating a clone of a data set of a source storage device by creating a snapshot image of the data. The snapshot image includes pointers to the data blocks that make up the data set but does not include duplicates of the data blocks. The clone is generated in response to receiving a token request from a host for the copy offload operation. The instructions also direct the processor to store the clone and a token that is a representation of the clone. The token is transmitted to the host in response to the token request. Finally, in response to receiving the token and an indication of a destination storage device, the copy offload operation is performed. If the data storage device and the destination storage device are not the same device, the data set is transferred from the data storage device to the destination storage device. If the data storage device and the destination storage device are the same device, a new instance of the clone on the data storage device is created.

Using the techniques introduced herein, copy offload processes can be implemented without the overhead of write-tracking, without the overhead of making copies of data for each block of data before it is written, and without the overhead of making copies of data each time a copy offload token is created.

Embodiments introduced here also include other methods, systems with various components, and non-transitory machine-readable storage media storing instructions which, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
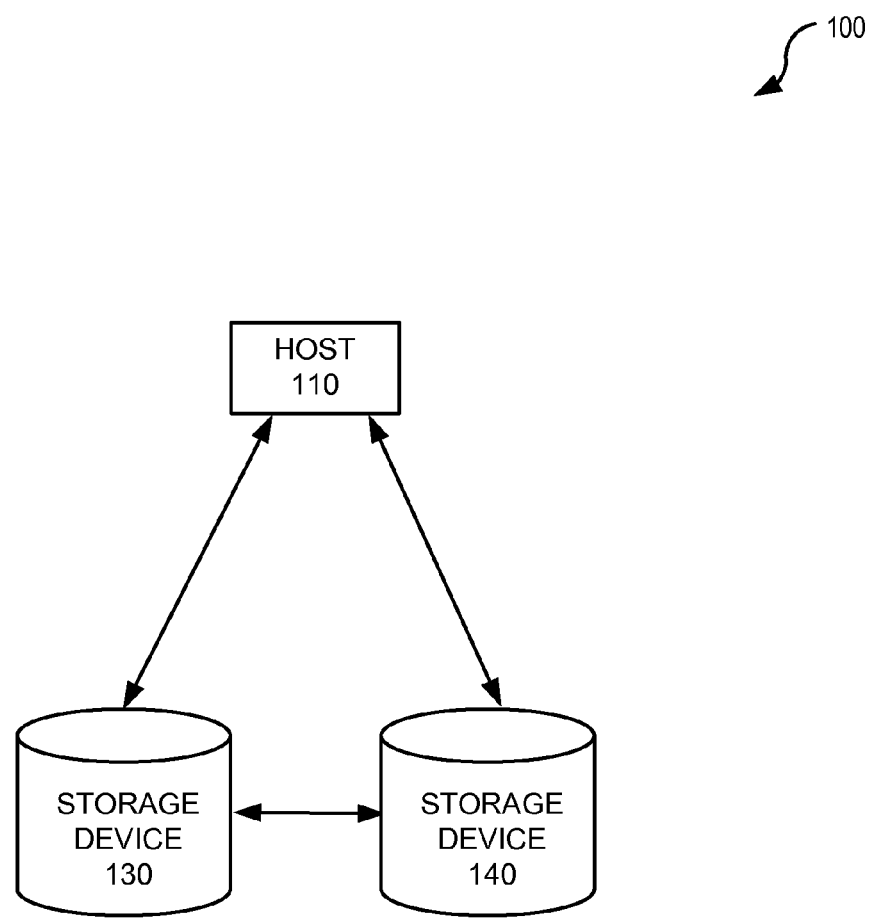
FIG. 1 illustrates an operating environment in which some embodiments of the disclosed technique may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments are shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Traditional methods of copying data from one location to another require a host to read data from a storage device and then transfer that data to a destination storage location. This approach has been traditionally used even when a copy of data is being made within a single storage device. This approach lacks efficiency because it uses host computing resources unnecessarily and sometimes results in use of additional storage space in the storage device. Copy offload processes were developed in order to allow data copy and data transfer to occur directly between storage devices without the data having to flow through one or more hosts. In a copy offload process, a host that seeks to copy or transfer data sends a request to a source storage device identifying the data to be copied or transferred. In the storage device, the data is located and a token is created that is a representation of the data. The token does not contain the data but acts as a unique identifier and/or locator for the data.

In order for the token to remain a valid representation of the data that existed when the token was created, the data it represents must remain valid and unchanged. If the data changes before or while the copy operation is being performed, the destination or recipient of the data would no longer receive a copy of the data as it existed when the copy offload operation was initiated. Existing systems resolve this problem by invalidating the token if the underlying data changes, performing write-tracking, or making a copy of the associated data when the token is created.

As described above, the existing approaches to the problems of changing data in tokenized copy offload processes each have drawbacks and/or add significant overhead to the data storage devices or systems. The solution introduced here addresses these problems. The solution utilizes a persistent point-in-time image, snapshot copy, or single instance storage cone (sis-clone) for performing copy offload operations. A persistent point-in-time image is a low-overhead copy of data made in a storage device or a storage system. In the solution introduced here, a persistent point-in-time image is created without actually copying any of the underlying data. It is created primarily by creating pointers to the existing blocks of data stored on the storage device that make up the original instance of the data. Similarly a sis-clone is an image of data that relies on a single instance of the underlying data. The terms snapshot copy, persistent point-in-time image, and sis-clone are used interchangeably herein as any of these may be used to implement the solution introduced here.

In systems where new and changed data is always written to new physical storage locations, a persistent point-in-time image remains unchanged even when the underlying data is changed. In some known storage systems, when data is changed, the system does not modify the changed data blocks in place. Rather, it writes each modified data block to a new physical storage location and changes the associated pointers. The original data blocks therefore are retained and remain unchanged. A persistent point-in-time image can be created in such a system such that the image is not truly a "copy" because no actual copies of the underlying data blocks are made when the persistent point-in-time image is created. Instead, the persistent point-in-time image is created by simply creating a new metadata block and storing in it pointers to the existing data blocks. The persistent point-in-time image can therefore be accessed via the new metadata block and its pointers to the original data blocks. The result is a read-only view of the underlying data that represents a frozen-time view of the underlying data at the point in time when the persistent point-in-time image was created that does not require copies to be made of any of the underlying data blocks. This method of creating a point-in-time image therefore greatly reduces the consumption of storage space in comparison to a technique that actually copies every data block.

Systems implementing persistent point-in-time images enable access to older versions of the underlying data. This characteristic is utilized by the solution introduced here, wherein persistent point-in-time images are used to support copy offload operations.

FIG. 1 illustrates an operating environment 100 in which some embodiments of the solution introduced here may be utilized. Operating environment 100 includes host 110, storage device 130, and storage device 140. Each of host 110, storage device 130, and storage device 140 are configured to communicate with the other devices. Communication may occur through a direct link or may occur through one or more networks.

Host 110 is any type of computing device that interfaces with data storage devices. For example, host 110 may be a server, a personal computer, a laptop computer, a smartphone, a tablet, or a microprocessor. Host 110 may also be a specialized computing device for controlling or interfacing to storage devices such as a storage controller, a data access component, a file server, or a storage server. Host 110 is a user and/or provider of data that is stored on storage device 130 and storage device 140. For the sake of simplifying description, only one host 110 and two storage devices 130, 140 are shown; however, additional hosts and/or storage devices can be present in practice.

Storage device 130 and storage device 140 are each any type of device for storing data and comprise a physical storage medium or media capable of storing data, for example, electronically, magnetically and/or optically. Storage device 130 and storage device 140 may each include, for example, a hard disk drive (HDD), a solid state storage device, a tape drive, an optical drive, or other type of non-volatile storage, including combinations thereof. Storage device 130 and storage device 140 may also contain volatile memory such as random access memory (RAM).

In some cases, storage device 130 and/or storage device 140 may each be a single hard disk drive with an integrated controller. In other cases, they may be much more complex storage devices or systems. For example, each of storage device 130 and storage device 140 may be a network-attached storage (NAS) system or a storage area network (SAN) or a component thereof, such as a storage server. The various elements used to implement storage device 130 and storage device 140 may be located physically together or distributed in various geographical locations. The storage devices may be arranged in a tiered storage arrangement or a non-tiered storage arrangement.

Storage device 130 and storage device 140 may also be implemented as a logical data container rather than as actual physical storage. A storage abstraction may include, for example, a file, volume, disk, virtual disk, logical unit, data stream, alternate data stream, metadata stream, or the like. Any abstraction may be repeated to any arbitrary depth. Storage device 130 may also be implemented in a different manner than storage device 140 and each may be implemented using combinations of the implementations described above.

Figure 2:
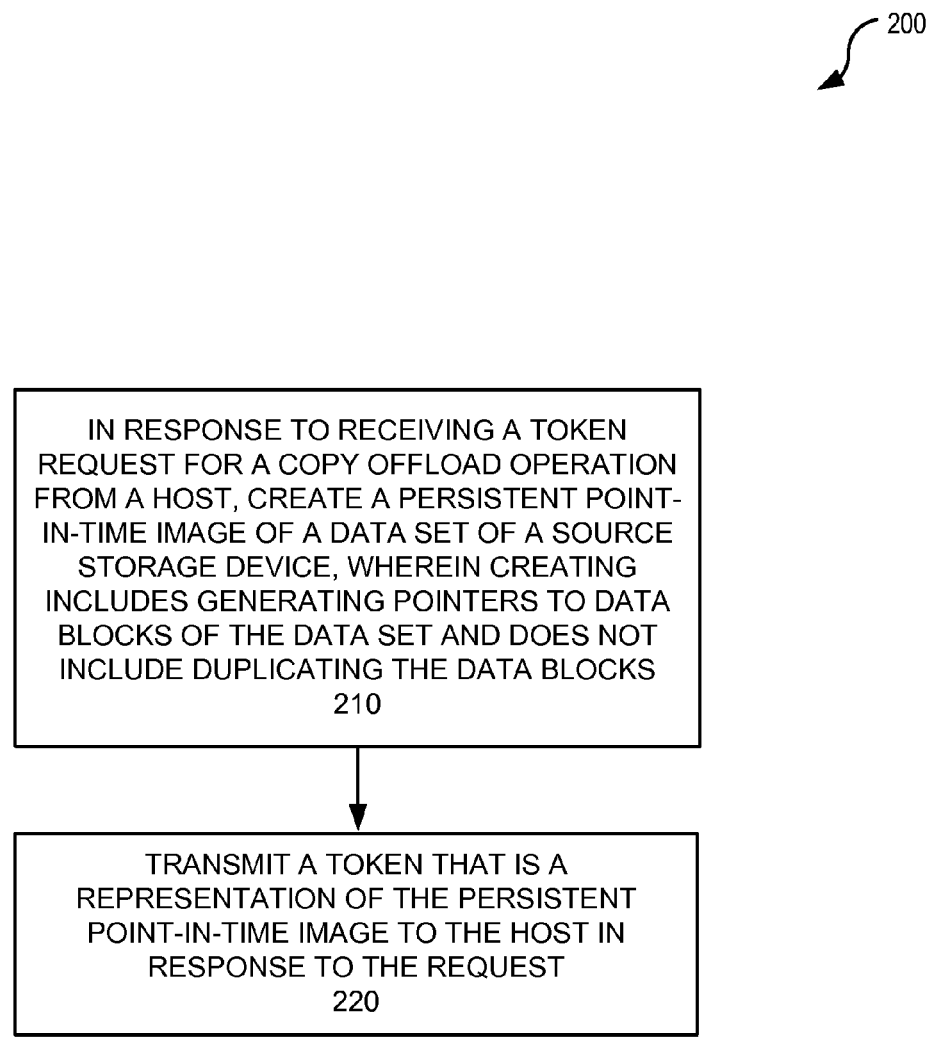
FIG. 2 illustrates a method of performing a copy offload operation.

FIG. 2 illustrates a method of performing a copy offload operation in one embodiment of the solution introduced here. FIG. 2 is described with respect to operating environment 100 although use in other operating environments is possible.

Host 110 initiates a copy offload process by identifying data that will be associated with the copy offload process and transmits a token request, also sometimes referred to as a token create request, to the storage device or system where the data resides. In this example, the data resides on storage device 130. In response to receiving the token request for the copy offload operation from host 110, storage device 130 creates a persistent point-in-time image of the data set (step 210). Creating the persistent point-in-time image includes generating pointers to data blocks of the data set, without copying or duplicating any of the data blocks. A token that is a representation of the persistent point-in-time image is then transmitted by storage device 130 to host 110 in response to the request (step 220). Advantageously, subsequent writes to the address of data associated with the token are made by writing any changed blocks to different physical storage locations of storage device 130. When this occurs pointers for the newly written data are created or updated and the pointers associated with the persistent point-in-time image are left unchanged. Therefore, the persistent point-in-time image and the token are not affected by these subsequent writes of the data. In some cases, a token may contain a random or pseudorandom number that is difficult to guess or arbitrarily generate. The token is typically much smaller than the data it represents. In some cases, the token is 512 bytes long.

After the token is received by host 110, it can then be used to initiate a copy offload operation in a number of different ways. Host 110 may transfer the token to another host or may use the token itself. In either case, the token is transferred to storage device 130 by the destination at some later point in time to initiate the copy step of the copy offload operation. A destination for the copy offload operation is also provided to storage device 130. Once storage device 130 receives the token and the destination, the previously created persistent point-in-time image is located using the information in the token and the data associated with that token is transferred to the destination. The destination may be storage device 140, another storage device, or another location in storage device 130. Storage device 130 is configured such that the data associated with the persistent point-in-time image is transferred directly to the destination without the data flowing through host 110, or another host as would occur in traditional buffered read/write operations. While host 110 is still involved in the handling of the tokens and the associated messages, the data is transferred directly from the source to the destination. This provides a significant processing and/or resource overhead savings in host 110 and also provides bandwidth savings in the communication links and/or networks used to communicate data between the hosts and the storage devices.

Figure 3:
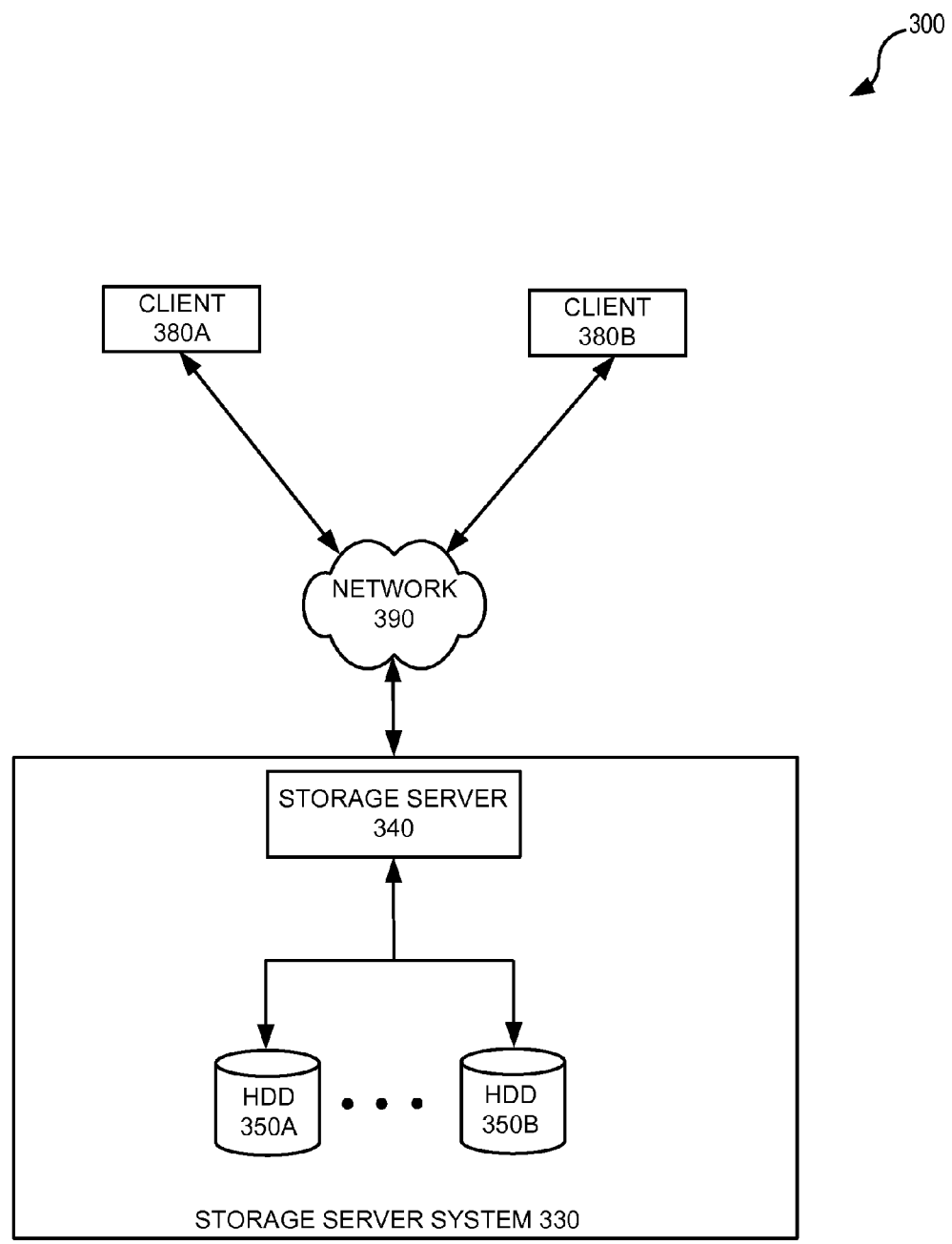
FIG. 3 illustrates another operating environment in which some embodiments of the disclosed solution may be utilized.

FIG. 3 illustrates an operating environment 300 in which some embodiments of the techniques introduced here may be utilized. Operating environment 300 includes storage server system 330, clients 380A and 380B, and network 390.

Storage server system 330 includes storage server 340, HDD 350A, and HDD 350B. Storage server system 330 may also include other devices or storage components of different types which are used to manage, contain, or provide access to data or data storage resources. Storage server 340 is a computing device that includes a storage operating system that implements one or more file systems. Storage server 340 may be a server-class computer that provides storage services relating to the organization of information on writable, persistent storage media such as HDD 350A and HDD 350B. HDD 350A and HDD 350B are hard disk drives. Storage server system 330 may also include other types of storage devices or memory including solid state drives (SSDs), tape drives, optical drives, and flash memory. A typical storage server system will include many more HDDs, or other storage devices, than are illustrated in FIG. 3. Storage server system 330 is illustrated as a monolithic system, but could include systems or devices which are distributed among various geographic locations. Storage server system 330 may also include additional storage servers which operate using storage operating systems which are the same or different from storage server 340.

Storage server 340 provides data storage services for clients such as client 380A and client 380B. The techniques and the teachings of this description can be adapted to a variety of storage architectures including, but not limited to, NAS, SAN, a disk assembly directly-attached to a client or host computer, an individual disk with a disk controller, or to another type of storage device. The term "storage server" should therefore be taken broadly to include such arrangements.

In one embodiment of the solution introduced here, a copy offload operation is performed on data stored in storage server system 330. The data may be stored on a single storage device of storage server system 330 or may be spread across a number of storage devices which make up storage server system 330 using one or more known methods or architectures such as Redundant Array of Independent Disks (RAID). Client 380A initiates the copy offload operation by sending a request to storage server system 330. The request includes an identification of data that client 380A wishes to copy. The data may be a single file, a group of files, a directory, a group of directories, an entire volume, or any other group or subset of data stored by storage server system 330.

Upon receiving the request, storage server system 330 identifies the data and creates a snapshot of the data using pointers to the data. Storage server 340 writes new data and changes to data to new physical storage locations, making it unnecessary for the data associated with the snapshot to be copied to create the snapshot. The pointers for the snapshot simply point to the original instances of the data blocks which make up the data in the snapshot. The snapshot is used as a copy of the data because the pointers which make up the snapshot and the data blocks that the pointers point to remain unchanged even if changes are made to the data blocks that contain the underlying data. This is true because any changes to the data blocks are stored by creating new data blocks in different physical locations rather than modifying the existing data blocks. In other words, even if the data is changed, the token continues to be a representation of and provide access to an unchanged instance of the data as it existed at the time the token was created because the snapshot remains unchanged and the data blocks pointed to by the snapshot also remain unchanged.

Storage server 340 then creates a token that is a representation or a unique identifier for the snapshot and the snapshot and the token are stored in a file, a dedicated area, or other reserved storage area in storage server system 330. Storage server 340 returns a copy of the token to client 380A. Because the snapshot is a frozen, read-only view of the data it is associated with, it does not change even if the data in the addressed data blocks that it references changes. Therefore, storage server system 330 can make changes to the underlying data in response to requests from client 380A, client 380B, or other devices, without affecting the snapshot or the token.

The token is used to initiate the second stage of the copy offload operation. The second stage involves the actual copying or transfer of data from the source to the destination. The copy offload may be initiated immediately after the creation of the token or may be performed at a later time. The token may be used by client 380A, client 380B, or by another host or client device that is in communication with storage server system 330. The token is transmitted to storage server 340 along with a destination for the copy offload. In this example, the destination is another location within storage server system 330. Storage server 340 uses the received token to identify and locate the previously made snapshot of the data. This process may include verifying or validating the token.

In this example, the source and the destination are both within storage server system 330. In some cases, the source and the destination may be in the same storage device, but represent different logical locations within that storage device. In other cases, both the source and destination may be spread across multiple of the physical storage devices which make up storage server system 330. Next, the copy is created at the destination based on the snapshot. In this example, because both the source and destination are part of storage server system 330, creating a copy at the destination may not require actual copying of the data.

The copy process can be achieved by copying the snapshot to the destination or by creating a set of pointers at the destination that are similar to the snapshot. The instance of the snapshot at the destination references the underlying data blocks using pointers in the same manner as the snapshot that was created in conjunction with the token. In other words, in this example, no data is copied and a snapshot is created at the destination without copying the underlying data blocks. The snapshot is not copied to the destination through a traditional buffered read/write process which flows through client 380A, client 380B, or any other client or host of storage server system 330. Performing this operation using a snapshot in the manner described above allows the operation to be performed without making copies of the underlying data blocks. Further, the copy offload operation is not disrupted if the data blocks that contain the underlying data are changed during the time period between the creation of the token and the use of the token.

Figure 4A:
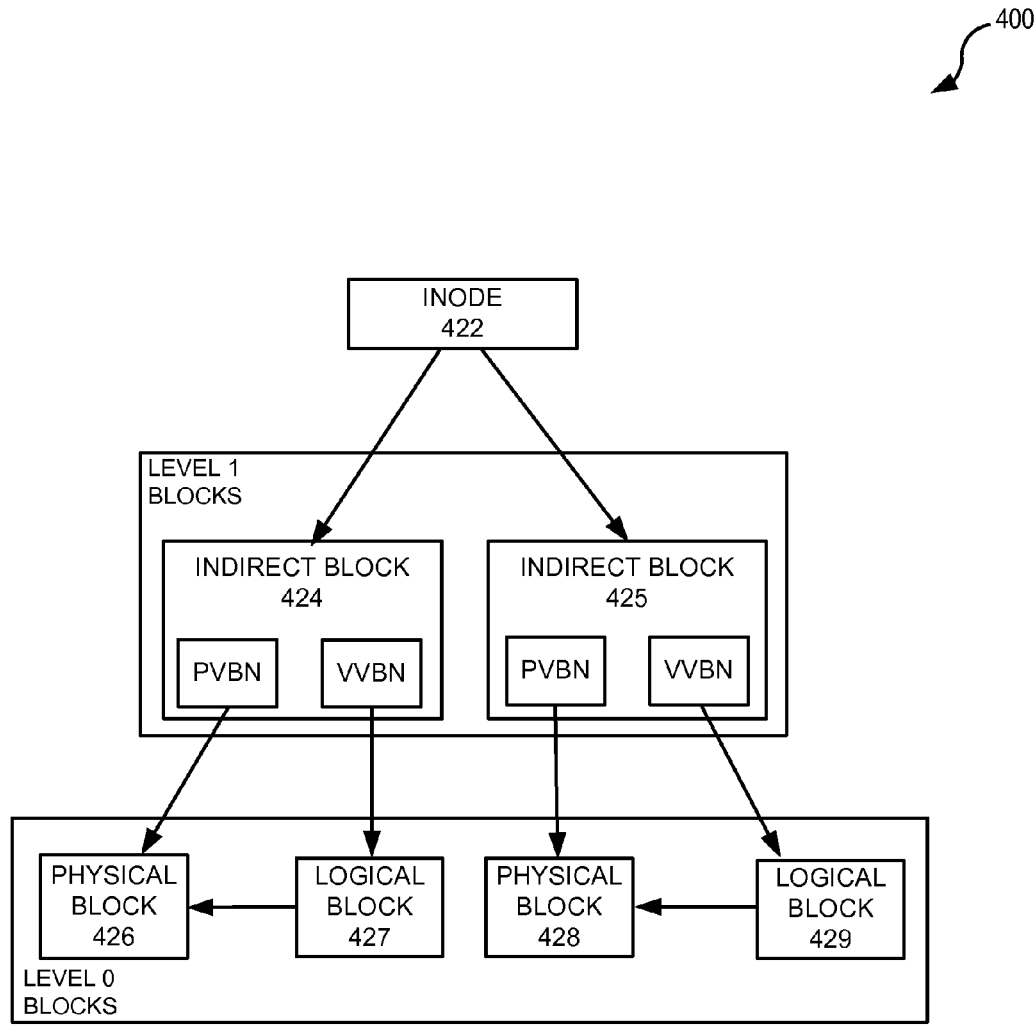
FIG. 4A illustrates a buffer tree.

FIG. 4A illustrates a buffer tree that may be used for creating a persistent point-in-time image in one embodiment of the solution introduced here. The buffer tree of FIG. 4 is a hierarchical data structure that contains the metadata and data that make up a file stored in a data storage device. The metadata in the buffer tree includes pointers for use in locating the blocks of data that make up the file. This type of hierarchical data structure may be used in storage device 130, storage device 140, storage server system 330, or another storage device used in conjunction with embodiments of the solution introduced here.

In a system of this type, the blocks of data that make up a file are not necessarily stored in sequential physical locations or in physical locations that have any other specific relationship to each other. The data blocks may be spread across many different physical locations of a storage device and may be spread across multiple storage devices. Over time, some of the blocks of data of the file may be moved to other locations while other blocks of the file are not moved. Consequently, the buffer tree is a mechanism for keeping track of the locations of all of the blocks of a file or a group of files. In addition, the level of abstraction provided by the buffer tree allows changes to be made to the physical layout of the data without these changes affecting the logical locations of the blocks or files.

A buffer tree includes one or more levels of indirect blocks that contain pointers to lower-level indirect blocks and/or to the direct blocks. Determining the actual physical location of a block may require working through several levels of indirect blocks. In the example of buffer tree 400, the blocks designated as "Level 1" blocks are indirect blocks. These blocks point to the "Level 0" blocks, or "direct" blocks, which are the actual data blocks (as opposed to metadata blocks) of the file. Additional levels of indirect blocks are possible. For example, buffer tree 400 may include level 2 blocks which point to level 1 blocks, which then point to the level 0 blocks. In some cases, some level 2 blocks of a group may point to level 1 blocks, while other level 2 blocks of the group point directly to level 0 blocks.

The root of buffer tree 400 is inode 422. An inode is a metadata container used to store metadata about the file, such as ownership of the file, access permissions for the file, file size, file type, and pointers to the highest-level of indirect blocks for the file. The inode is typically stored in a separate inode file. The inode is the starting point for finding the location of all of the associated data blocks. In the example illustrated, inode 422 references level 1 indirect blocks 424 and 425. Each of these indirect blocks stores a least one physical volume block number (PVBN) and a corresponding virtual volume block number (VVBN). For purposes of illustration, only one PVBN-VVBN pair is shown in each of indirect blocks 424 and 425. However, many PVBN-VVBN pairs may be included in each indirect block.

Each PVBN references a physical block in the storage device and the corresponding VVBN references the associated logical block number in the volume. In the example illustrated the PVBN in indirect block 424 references physical block 426 and the PVBN in indirect block 425 references physical block 428. Likewise, the VVBN in indirect block 424 references logical block 427 and the VVBN in indirect block 425 references logical block 429. Logical blocks 427 and 429 point to physical blocks 426 and 428, respectively. When a block of data is moved to another location, the indirect block associated with the block is updated to reflect the new location. Since the indirect block is updated, it is not necessary to update the inode. The various blocks that make up a file may be scattered among many non-contiguous physical locations and may even be split across different types of storage media within a storage server system.

Figure 4B:
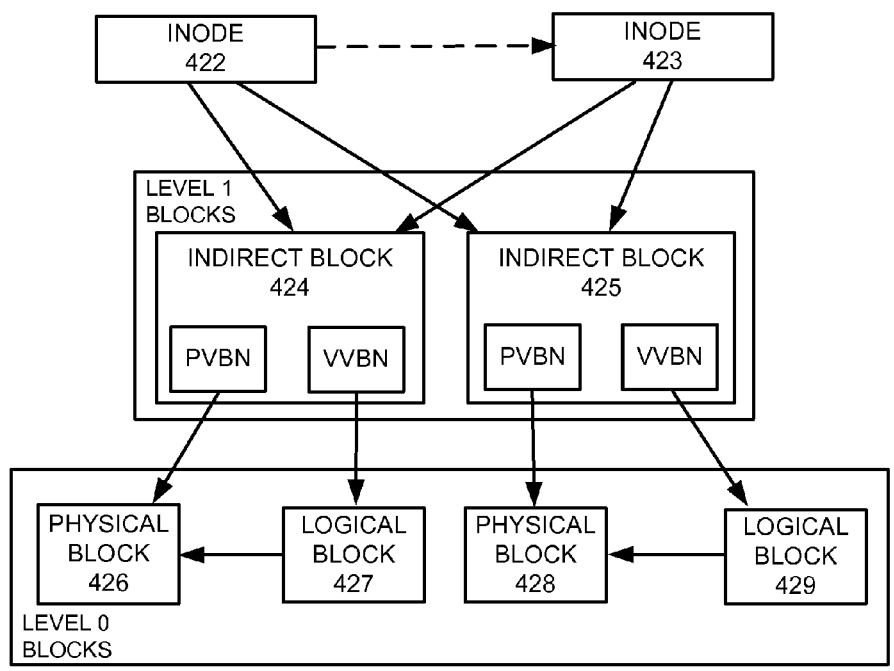
FIG. 4B illustrates creation of a persistent point-in-time image using a buffer tree.

FIG. 4B illustrates creation of a persistent point-in-time image using a buffer tree in one embodiment of the solution introduced here. In this example, a persistent point-in-time image of the file associated with inode 422 is created. Creating the persistent point-in-time image includes creating inode 423 from inode 422. Inode 423 includes copies of the pointers which make up inode 422. Because inode 423 refers to the same indirect Level 1 blocks as inode 422, it also refers to the same physical blocks of data that are associated with inode 422. Inode 422 is the inode that is actively used by the file storage system for accessing the file associated with it, while inode 423 is maintained as the persistent point-in-time image of the data that is associated with a token created for the copy offload process.

In some cases, inode 423 may not make use of indirect blocks 424 and 425. In these cases, inode 423 will use different indirect blocks (i.e., different Level 1 blocks) to point to the shared Level 0 or physical blocks.

Figure 4C:
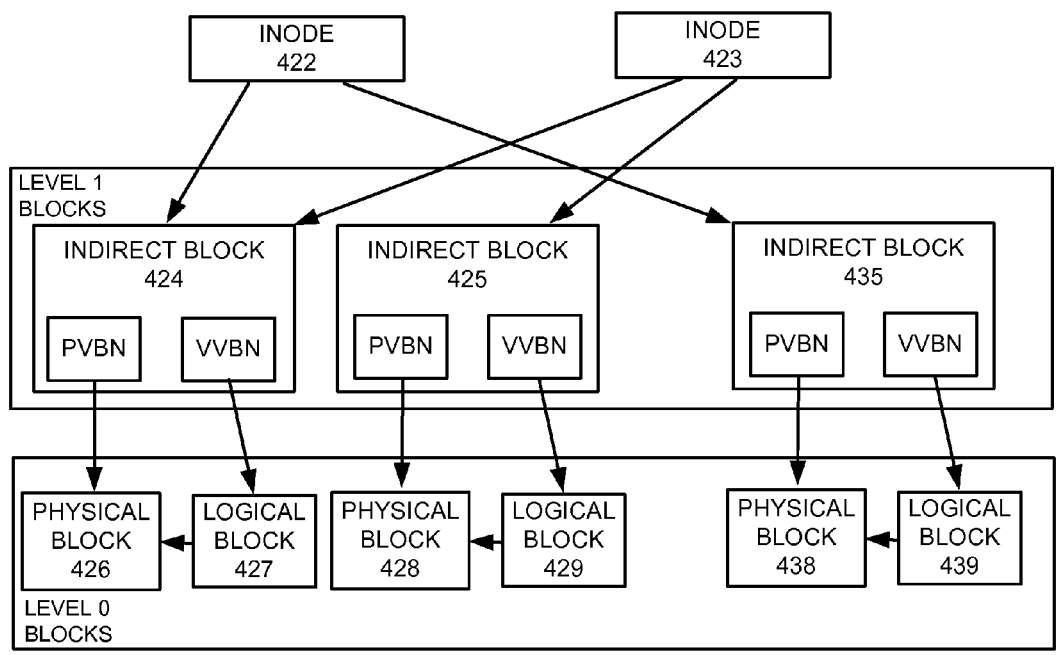
FIG. 4C illustrates a buffer tree and a persistent point-in-time image after data associated with the buffer tree has been changed.

FIG. 4C illustrates the buffer tree and persistent point-in-time image of FIG. 4B after data associated with the buffer tree has been changed. In FIG. 4C, the buffer tree has been changed because the file associated with inode 422 has been written with new or changed data. In this case, the writing of the new or changed data is associated with a change to the data that is associated with inode 422. The revised file associated with inode 422 still contains the same original data of physical block 426. However, it no longer contains the data of physical block 428. Instead, it contains the data of physical block 438. When the change was written to the file associated with inode 422, rather than rewriting physical block 428, the new data was written to a new physical block, physical block 438. A new indirect block, indirect block 435, is also created in the process.

After the change is written, the file associated with inode 422 includes the data of physical bock 426 and physical block 438. However, inode 423, which is associated with the persistent point-in-time image for the copy offload process, still references indirect blocks 422 and 423. Both inode 422 and inode 423 still reference indirect block 424 and physical block 426 as this data has not changed since the persistent point-in-time image was created. Therefore, the persistent point-in-time image still references data blocks representative of the original version of file, even though the file has been subsequently changed. In this way, the persistent point-in-time image and the associated token can remain valid despite changes to the blocks that contained the underlying data. This configuration also allows the persistent point-in-time image to be accessed or utilized while the original data in the underlying blocks are being accessed or changed. If the file associated with inode 422 is further changed in a manner which affects the data of physical block 426, another new physical block is allocated for the new data. In this case, inode 423 would still point to physical blocks 426 and 428, while inode 422 would point to physical block 438 and the other new data block.

Figure 5:
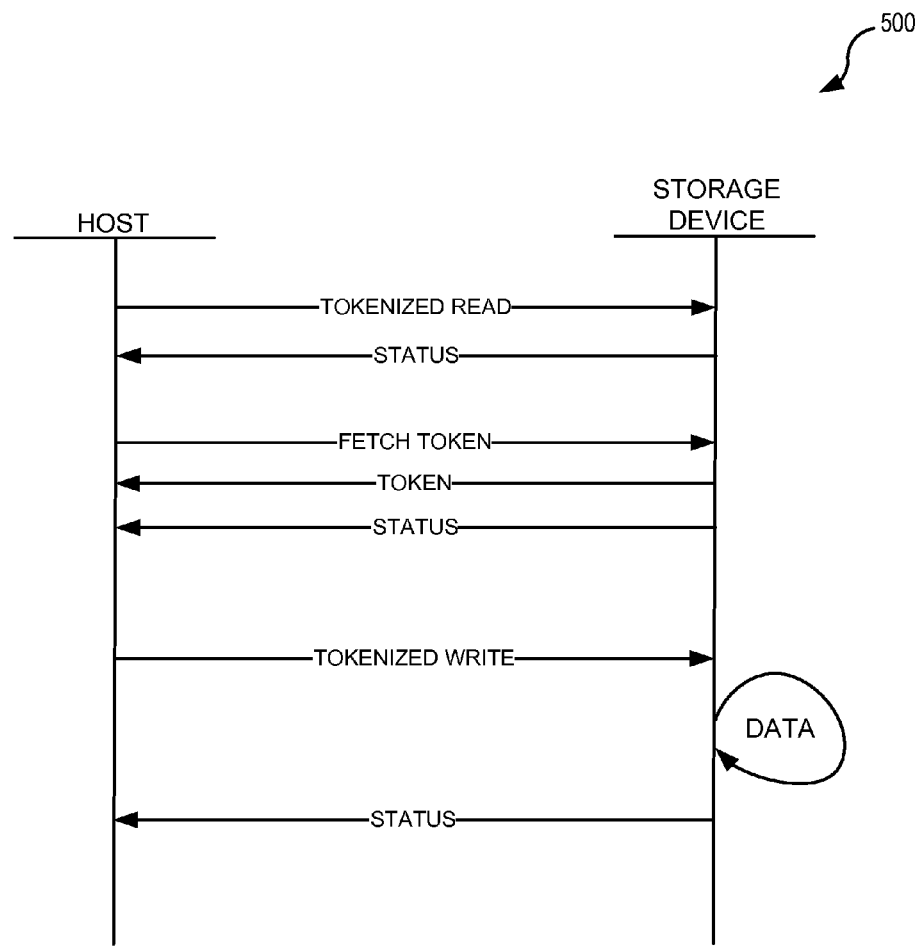
FIG. 5 illustrates communication between a host and a storage device for performing a copy offload operation.

FIG. 5 illustrates communication between and a host and a storage device for performing a copy offload process in one embodiment of the solution introduced here. In this example, the host transmits a tokenized read message to the storage device. The tokenized read message may also be referred to as a token create message in some cases. The tokenized read message includes identification of data in the storage that will be the basis of the copy offload operation. In some cases, the tokenized read is transmitted in a standardized SCSI message format and may be transmitted within the framework of existing storage device communication protocol. In response to the tokenized read, the storage device creates a snapshot or a persistent point-in-time image of the data as described in the examples above. When a fetch token request is received, the storage device returns a token that represents the persistent point-in-time image to the host. In some cases, the token may be transferred back to the host in response to the tokenized read message without a fetch token request message being sent.

In order for the copy operation to take place, the token is transferred back to the storage device in the form of a tokenized write message that also identifies a destination for the copy operation. In some cases, the tokenized write message may also be referred to as a tokenized copy message. In response, the storage device performs the copy operation. In this case, the data is being copied to a destination within the same storage device. In some cases, the data blocks associated with the persistent point-in-time image are copied to the destination to complete the copy offload process. In other cases, where the destination is within the same storage device, the persistent point-in-time image may be cloned to the destination to complete the copy offload process rather than making copies of the data blocks. This latter approach makes further use of the original instances of the data blocks. In either case, the copy offload process is completed without transferring the data to the host or transferring the data through the host.

Figure 6:
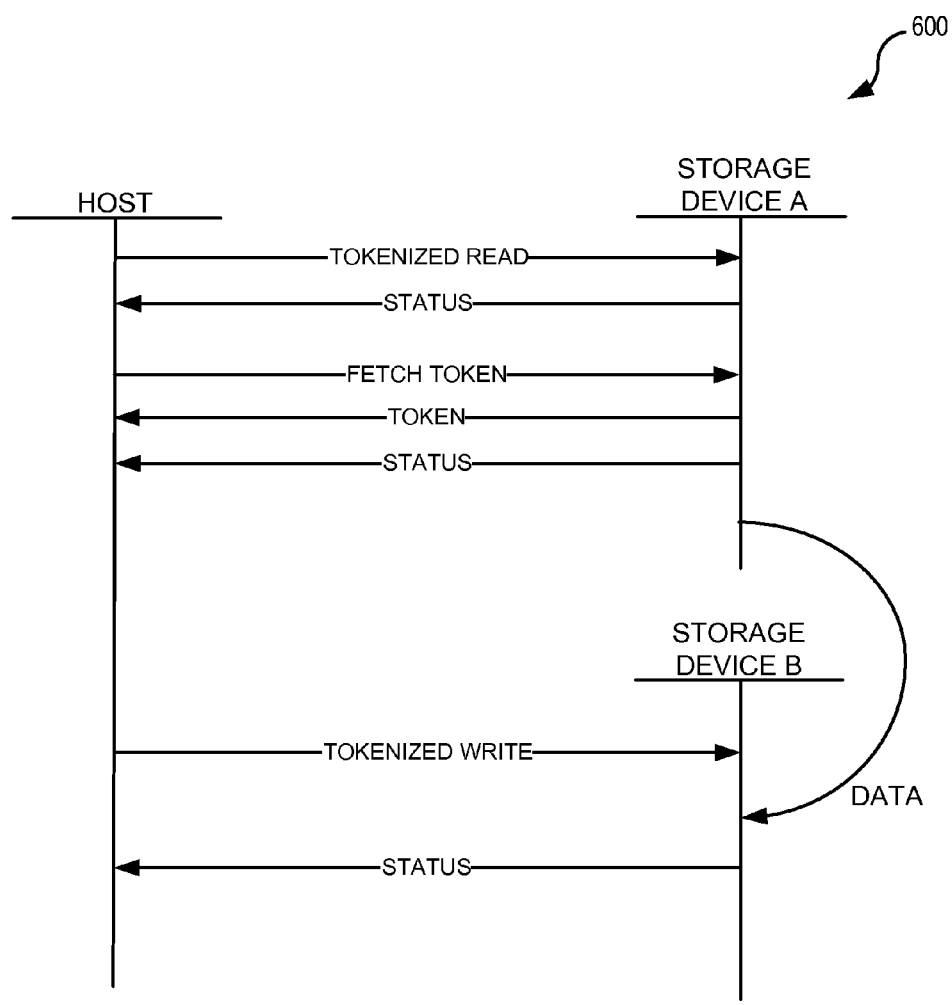
FIG. 6 illustrates communication between a host and two storage devices for performing a copy offload operation.

FIG. 6 illustrates communication between a host and two storage devices for performing a copy offload process in one embodiment of the solution introduced here. Similar to the communication process illustrated in FIG. 5, the host transmits a tokenized read message to storage device A and receives a token in response to a fetch token request message. At a later point in time, the host transmits a tokenized write message to storage device B, the destination for the copy offload process in this example. The tokenized write message includes the token. Storage device B transmits the received token to storage device A. Storage device A uses the token to identify the associated persistent point-in-time image which is then used to locate the data blocks. Storage device A transmits the data blocks to storage device B in response to receiving the token. In some cases, additional messages may be exchanged between the storage devices in conjunction with the data transfer. For example, device B may first send the token to device A to have the data prepared and then send additional commands to extract the prepared data from device A. Once the transfer is complete, storage device B transmits a status message to the host. As illustrated, the data is transferred between the storage devices to complete the copy offload process and is not transmitted to or through the host.

The transfer of the data from the source to the destination may be conducted using a push model or a pull model. In a push model, the source storage device, after receiving and verifying the token, controls the process through which the data is transferred to the destination storage device. In a pull model, the destination storage controls the transfer process by retrieving or reading the data from the source storage device after the token has been verified.

Figure 7:
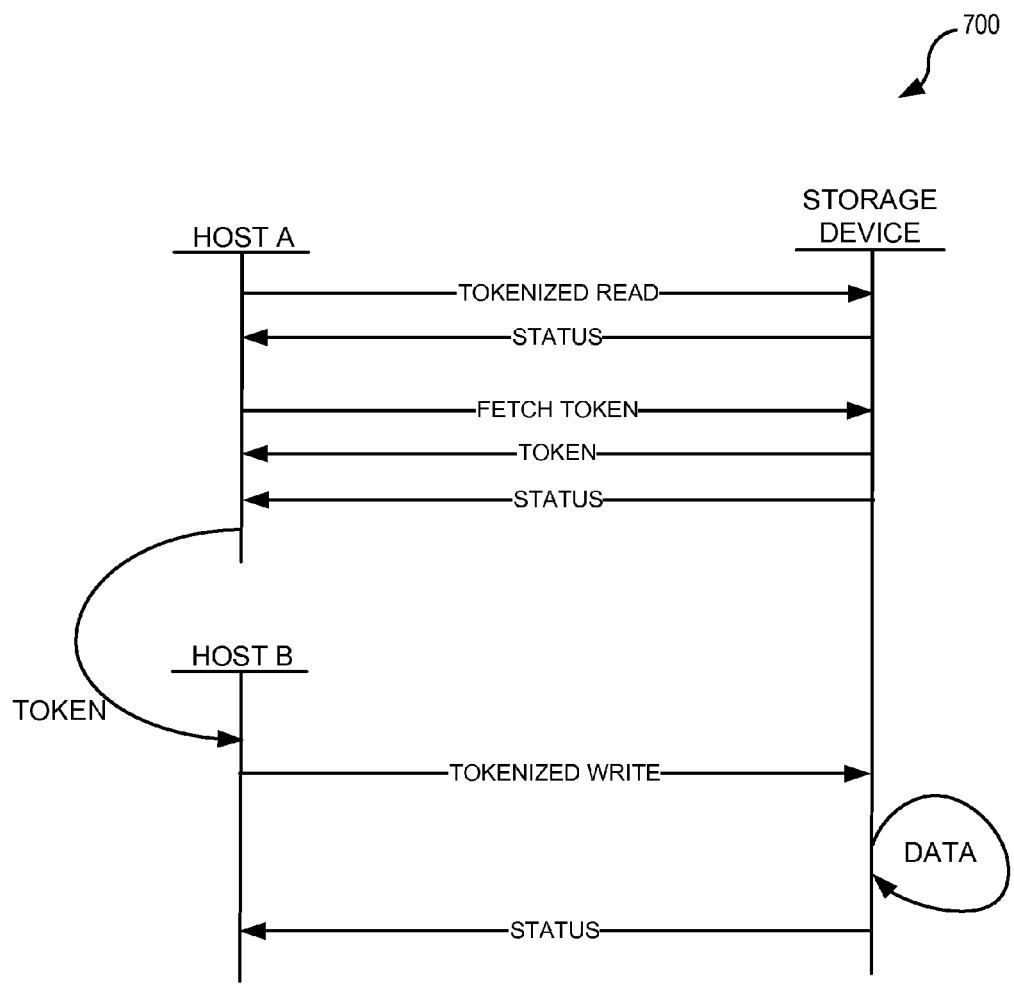
FIG. 7 illustrates communication between two hosts and a storage device for performing a copy offload operation.

FIG. 7 illustrates communication between two hosts and a storage device for performing a copy offload process in one embodiment of the solution introduced here. In this example, one host is associated with the initiation of the copy offload process and creation of the token and another host completes the copy offload process. Host A transmits a tokenized read message to the storage device. The storage device creates a persistent point-in-time image and transmits a token that is a representation of that image to host A. Host A transfers the token to host B. At a later point in time, host B transfers the token to the storage device in a tokenized write message. The storage device uses the token to identify the associated persistent point-in-time image. As in the case of FIG. 5, the process may be performed by copying data blocks associated with the persistent point-in-time image to another location with the storage device or by cloning the persistent point-in-time image to the destination. The storage device transmits a status message back to host B when the process is complete. In a variation of this example, the source and the destination for this copy offload process may be different storage devices as in FIG. 6.

Figure 8:
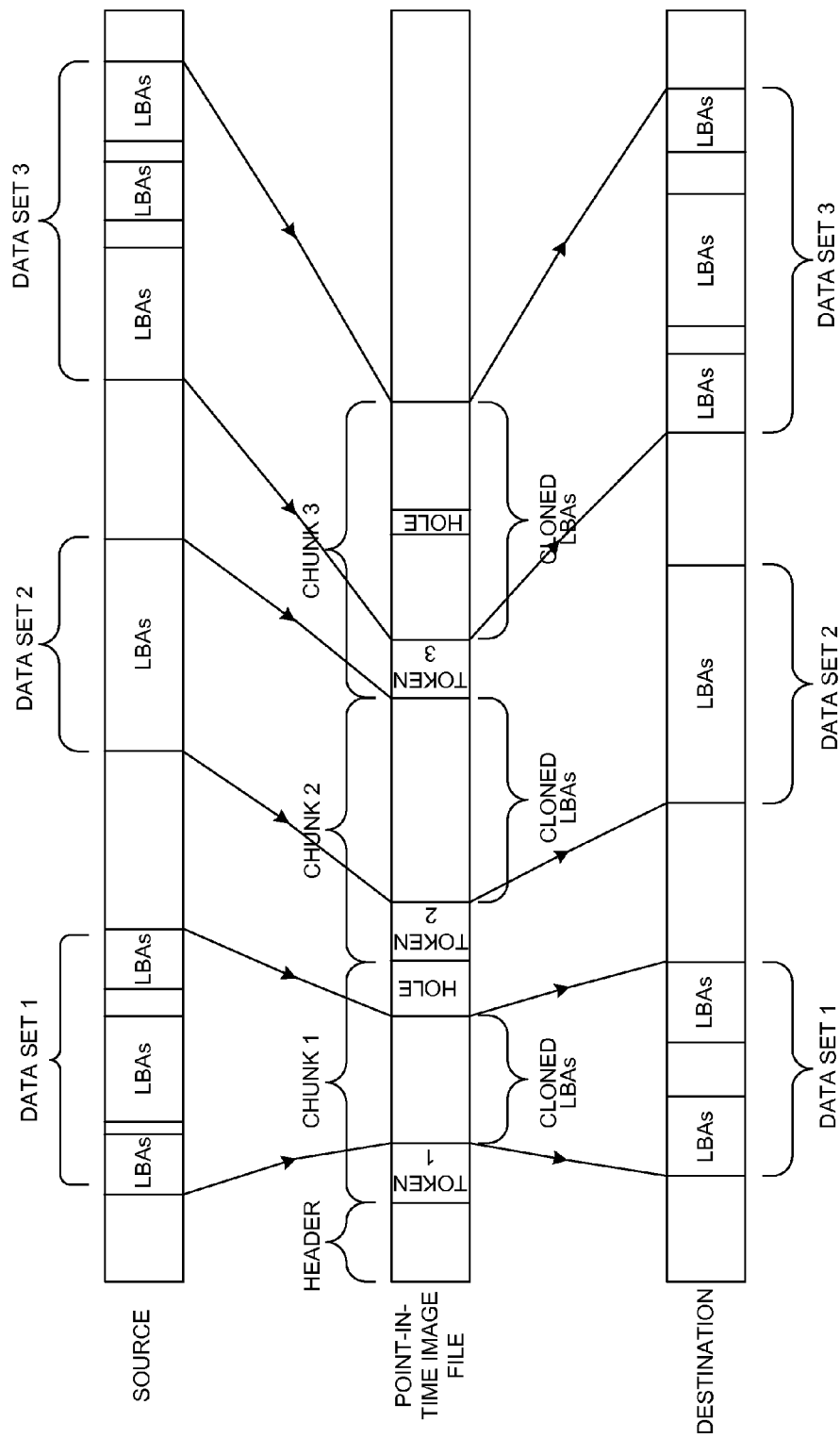
FIG. 8 illustrates the creation and storage of a clone in performing a copy offload operation.

FIG. 8 illustrates performance of a copy offload operation of multiple data sets in one embodiment of the solution introduced here. Each data set may be a file, a group of files, a directory, a group of directories, a volume, or any other grouping of data. A source data device contains data that is stored in physical block locations on the storage device. The data stored in the physical block locations is referenced by logical block addresses (LBAs). LBAs provide a level of virtualization and are used to specify the actual storage location of data blocks on the storage device. In this example, the copy offload process includes three data sets that each includes a range of LBAs. As illustrated in the data sets 1 and 3, the data which makes up a data set does not have to be associated with contiguous ranges of physical LBAs.

As in some of the other embodiments discussed above, a copy offload process is initiated by receiving a request from a host. A point-in-time image file is created to contain the persistent point-in-time images, snapshots, or clones of the LBAs (sis-clones) that are the subjects of the copy offload process. The point-in-time image file may be stored in the source storage device, the destination storage device, or in another storage location. A single point-in-time image file may contain clones for multiple data sets and a header indicating other information about the file. For example, the header may contain information about which portions, or chunks, of the point-in-time image file contain valid information. In some cases, the token storage areas illustrated in the point-in-time image file of FIG. 8 may each be headers which include the tokens as well as other information such as offsets into the point-in-time image file. The point-in-time image file may also include a master header that indicates locations of free chunks of storage in the point-in-time file.

The cloned LBAs for each of the data sets are stored in the point-in-time image file. The cloned LBAs contain pointers to the associated LBAs and do not contain actual copies of the data. The cloned LBAs contain copies of the previously described indirect blocks that point to the original data. A token is created for each token request. The token references the cloned LBAs associated with the request that created the token. The token is used to uniquely identify and locate each of the cloned LBAs. A token and the cloned LBAs are collectively referred to as a chunk in the point-in-time image file. A chunk may also contain a hole. As illustrated in chunk 3, a clone of LBAs may also include a hole in order to satisfy data alignment requirements within the cloned LBAs, or for other reasons.

The tokens for a copy offload process are transferred to the host that initiated the copy offload process. The LBAs and the data are not sent to the host. At a later point in time, one or more of the tokens are provided back to the source with instructions to copy the associated data to a designated destination. The data of interest is located using the token and copied to the destination using the pointers stored in cloned LBA ranges stored in the point-in-time image file. As discussed above with respect to the pull model, the destination may also use the token to pull the data from the source.

As in previous examples, any changes made to the data sets between the time the tokens were created and used will not affect the associated data sets because any changes to the data sets are written to new physical storage locations in the source storage device. The pointers which are stored in the chunks in the point-in-time image file point to the original, unchanged blocks of data. Once a token expires, the chunk associated with that token may be freed by punching a hole in the point-in-time image file and updating a header accordingly. In some cases, this header is the master header described above.

A token may have a designated expiration time at which the token becomes invalid. In addition, a host may also send a message to invalidate a token prior to its expiration. In some cases, a token may also include or be associated with other data. This other data may include data that identifies the storage device, storage system, or other entity from which the data may be obtained, identification information of a network storage system, routing instructions, information regarding access control mechanisms, checksums associated with the token or the underlying data, type of data, access patterns for the data (e.g., sequential, random), usage patterns (e.g., access frequency), desired alignment of the data, and/or data for optimizing placement of the data during the offload write process.

FIG. 8 illustrates one example of how a point-in-time image file may be structured, but other configurations are possible. In one variation, all of the tokens may be combined together in one area of the file, while the cloned LBAs are combined in another area of the file. In another variation, each of the chunks may be stored in separate files. In yet another variation, all of the tokens are stored in one file while the cloned LBAs are stored in another file. An additional index file or tracking file may be used to track the tokens and LBAs when the point-in-time image file is made up of multiple files. In yet another variation, the tokens and/or cloned LBAs may be stored in reserved areas of designated areas of the storage device that are not a file.

Embodiments of the solution introduced here include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EE-PROMs), magnetic or optical cards, flash memory, or other type of machine-readable medium suitable for storing electronic instructions. Moreover, embodiments of the solution introduced here may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the solution introduced here, and may be included in more than one embodiment. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A method comprising:
in response to receiving a token request for a copy offload operation from a host, creating a persistent point-in-time image of a data set of a source storage device, wherein the creating includes generating pointers to data blocks of the data set and does not include duplicating the data blocks;
transmitting a token that is a representation of the persistent point-in-time image to the host in response to the request; and
writing to the data set without affecting the persistent point-in-time image and the token, wherein writing to the data set includes storing new data associated with the writing in different physical locations of the source data storage device than are used for the data blocks and leaving the data blocks unchanged.

2. The method of claim 1 wherein the persistent point-in-time image is a single instance storage clone of the data set.

3. The method of claim 1 further comprising:
receiving, at the source storage device, a request to copy the dataset, the request including the token and an indication of a destination data storage device;
transferring the data set from the persistent point-in-time image to the destination data storage device, without transferring the data set to the host, if the source data storage device and the destination storage device are not the same device; and
generating a new instance of the persistent point-in-time image on the source data storage device if the source data storage device and the destination storage device are the same device.

4. The method of claim 1 further comprising:
receiving, at a destination storage device, a request to copy the dataset, the request including the token;
retrieving the data set from the persistent point-in-time image by the destination data storage device, without transferring the data set to the host, if the source data storage device and the destination storage device are not the same device; and generating a new instance of the persistent point-in-time image if the source data storage device and the destination storage device are the same device.

5. The method of claim 1 wherein the copy offload operation is a Small Computer System Interface (SCSI) T10 compliant copy offload operation.

6. The method of claim 1 wherein the token is a first token, the persistent point-in-time image is a first point-in-time image, and further comprising:
creating, in the source data storage device, a second persistent point-in-time image that is associated with a second data set in response to a second token request that identifies the second data set; and
transmitting a second token that is a representation of the second persistent point-in-time image in response to the second token request.

7. The method of claim 6 wherein the first token, the second token, the first persistent point-in-time image, and the second persistent point-in-time image are stored in a file in the source data storage device.

8. The method of claim 1 wherein the token expires at a designated expiration time.

9. The method of claim 8 wherein storage space associated with the token and the persistent point-in-time image is freed when the token expires.

10. The method of claim 1 wherein the token and the persistent point-in-time image are stored in a reserved area in the data storage device.

11. The method of claim 1 wherein the token and the persistent point-in-time image are stored in separate reserved areas.

12. The method of claim 1 wherein a Network Attached Storage (NAS) device receives the token request and creates the persistent point-in-time image.

13. The method of claim 1 wherein a Storage Area Network (SAN) device receives the token request and creates the persistent point-in-time image.

14. A data storage system comprising:
a data storage device; and
a processor configured to:
create a persistent point-in-time image of a data set of a source storage device in response to receiving a token request associated with a copy offload operation from a host, wherein the persistent point-in-time image includes pointers to data blocks of the data set and does not include duplicates of the data blocks;
store the token and the persistent point-in-time image in a file;
transmit a token that is a representation of the persistent point-in-time image to the host in response to the request; and
change the data set without changing the persistent point-in-time image and the token by writing changed data blocks to one or more different physical locations of the data storage device and leaving the data blocks unchanged.

15. The data storage system of claim 14 wherein the processor is further configured to:
receive a request to copy the dataset, the request including the token;
validate the token;
transfer the data set from the persistent point-in-time image to a destination data storage device, without transferring the data set to the host, if the data storage device and the destination storage device are not a same device; and
create a new instance of the persistent point-in-time image on the data storage device if the data storage device and the destination storage device are the same device.

16. The data storage system of claim 14 wherein the token is a first token, the persistent point-in-time image is a first point-in-time image, and the processor is further configured to:
create a second persistent point-in-time image that is associated with a second data set in response to receiving a second token request identifying the second data set;
generate a second token that is a representation of the second persistent point-in-time image;
store the second token and the second persistent point-in-time image; and
transmit the second token in response to the second token request.

17. The data storage system of claim 16 wherein the first token, the second token, the first persistent point-in-time image, and the second persistent point-in-time image are stored in a file in the data storage device.

18. The data storage system of claim 14 wherein the token is SCSI compliant.

19. The data storage system of claim 14 wherein the token expires at a designated expiration time and storage space associated with the token and the persistent point-in-time image is freed when the token expires.

20. The data storage system of claim 14 wherein the token and the persistent point-in-time image are stored in a file.

21. The data storage system of claim 14 wherein the token and the persistent point-in-time image are stored in separate files in the data storage device.

22. A non-transitory machine-readable medium comprising instructions that, when executed by at least one processor, direct the at least one processor to perform a copy offload operation that includes:
generate a clone of a data set of a source storage device by creating a point-in-time image of the data set that includes pointers to data blocks of the data set and does not include duplicates of the data blocks, wherein the clone is generated in response to receiving a token request from a host for the copy offload operation that identifies the data set;
store, in at least one dedicated area, the clone and a token that is a representation of the clone;
transmit the token to the host in response to the token request;
in response to receiving the token and an indication of a destination storage device, transfer the data set from the cloned data blocks to the destination storage device without transferring the data set to the host if the source storage device and the destination storage device are not the same device and create a new instance of the clone on the source storage device if the source storage device and the destination storage device are the same device; and
write to the data set without affecting the point-in-time image and the token, wherein the write includes storing new data associated with the write in one or more different physical locations of the source storage device than are used for the data blocks and leaving the data blocks unchanged.

23. The medium of claim 22 wherein the token is a first token, the clone is a first clone, and the processor is further configured to:
receive a second token request identifying a second data set of the source storage device to be copied;

create a second clone that is associated with the second data set;

generate a second token that is a representation of the second clone; and transmit the second token to the host in response to the second token request.

24. The medium of claim 23 wherein the at least one dedicated area is one dedicated area and the first token, the second token, the first clone, and the second clone are stored in the one dedicated area.

25. The medium of claim 22 wherein the token request is a tokenized SCSI read message.

26. The medium of claim 22 wherein the token is received in a tokenized SCSI write message.

27. The medium of claim 22 wherein the token and the clone are stored in separate dedicated areas.

* * * * *